United States Patent
Deegan et al.

(10) Patent No.: US 9,521,299 B2
(45) Date of Patent: Dec. 13, 2016

(54) METHOD FOR OPERATING A CAMERA IN A COVERED STATE, CAMERA FOR A MOTOR VEHICLE AND MOTOR VEHICLE

(71) Applicant: Connaught Electronics Ltd., Tuam, County Galway (IE)

(72) Inventors: Brian Michael Thomas Deegan, Ennis (IE); Patrick Eoghan Denny, Roscam (IE); John Toner, Claregalway (IE); Vincent Duffy, Hollymout (IE); Fergal Lydon, Rosscahill (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 0 days.

(21) Appl. No.: 14/652,288

(22) PCT Filed: Dec. 17, 2013

(86) PCT No.: PCT/EP2013/076796
§ 371 (c)(1),
(2) Date: Jun. 15, 2015

(87) PCT Pub. No.: WO2014/095778
PCT Pub. Date: Jun. 26, 2014

(65) Prior Publication Data
US 2015/0334272 A1    Nov. 19, 2015

(30) Foreign Application Priority Data
Dec. 17, 2012 (DE) .................... 10 2012 024 660

(51) Int. Cl.
*H04N 5/225* (2006.01)
*H04N 5/235* (2006.01)
(Continued)

(52) U.S. Cl.
CPC ............. *H04N 5/2251* (2013.01); *B60R 11/04* (2013.01); *H04N 5/235* (2013.01); *H04N 5/2353* (2013.01);
(Continued)

(58) Field of Classification Search
None
See application file for complete search history.

(56) References Cited

U.S. PATENT DOCUMENTS

| 2,012,162 A | 8/1935 | Furlong |
| 6,819,231 B2 | 11/2004 | Berberich et al. |

(Continued)

OTHER PUBLICATIONS

International Search Report in corresponding PCT Application No. PCT/EP2013/076796 mailed Mar. 11, 2014 (2 pages).

*Primary Examiner* — Shahbaz Nazrul
(74) *Attorney, Agent, or Firm* — Osha Liang LLP

(57) ABSTRACT

The invention relates to a method for operating a camera (3, 4) of a motor vehicle (1), wherein a cover (10, 11) is moved between an operating position, in which the camera (3, 4) provides images of an environmental region (12, 13) of the motor vehicle (1), and a covering position, in which the cover (10, 11) covers the camera (3, 4) against the environmental region (12, 13). The current brightness level of a scene of the camera (3, 4) is acquired by means of the camera (3, 4); in the operating position of the cover (10, 11), at least one operating parameter of the camera (3, 4) is adjusted depending on the current brightness level of the scene; a movement operation of the cover (10, 11) from the operating position into the covering position is acquired by the camera (3, 4); and after acquiring the movement operation, the at least one operating parameter is adjusted to a value independent of the current brightness level of the scene acquired by the camera (3, 4), in particular whilst maintaining an activated operating state of the camera (3, 4).

13 Claims, 3 Drawing Sheets

Figure 1:
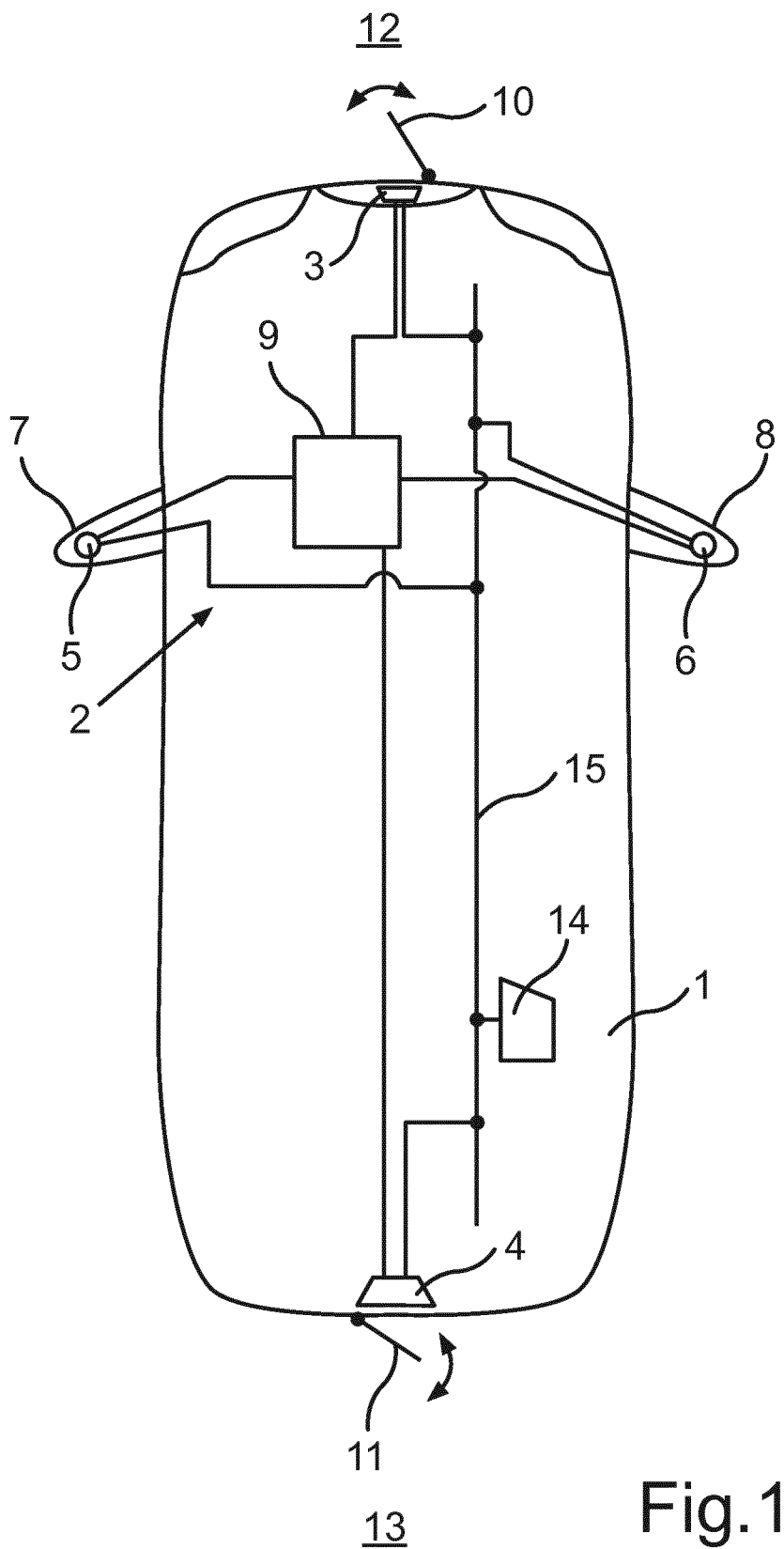

(51) Int. Cl.
 H04N 5/247 (2006.01)
 B60R 11/04 (2006.01)
(52) U.S. Cl.
 CPC ......... *H04N 5/247* (2013.01); *B60R 2300/105* (2013.01); *B60R 2300/70* (2013.01)

(56) References Cited

U.S. PATENT DOCUMENTS

| | | | | |
|---|---|---|---|---|
| 7,903,843 | B2* | 3/2011 | Sawaki | G08G 1/168 |
| | | | | 382/104 |
| 8,421,865 | B2* | 4/2013 | Euler | B60R 1/00 |
| | | | | 348/113 |
| 9,260,062 | B2* | 2/2016 | Kamps | B60R 11/04 |
| 2006/0171704 | A1* | 8/2006 | Bingle | B60R 11/04 |
| | | | | 396/419 |
| 2010/0040361 | A1* | 2/2010 | Schuetz | B60R 11/04 |
| | | | | 396/428 |
| 2011/0096164 | A1* | 4/2011 | Mori | G02B 7/003 |
| | | | | 348/143 |
| 2012/0293656 | A1* | 11/2012 | Schutz | B60R 11/04 |
| | | | | 348/148 |
| 2013/0209079 | A1* | 8/2013 | Alexander | B60R 11/04 |
| | | | | 396/25 |
| 2013/0294758 | A1* | 11/2013 | Barthel | B60R 11/04 |
| | | | | 396/428 |
| 2014/0160284 | A1* | 6/2014 | Achenbach | H04N 5/2251 |
| | | | | 348/143 |
| 2014/0248045 | A1* | 9/2014 | Wada | G03B 17/561 |
| | | | | 396/427 |
| 2016/0144798 | A1* | 5/2016 | Yoshikuni | B60R 11/04 |
| | | | | 348/148 |

* cited by examiner

METHOD FOR OPERATING A CAMERA IN A COVERED STATE, CAMERA FOR A MOTOR VEHICLE AND MOTOR VEHICLE

The invention relates to a method for operating a camera of a motor vehicle, wherein an opaque cover is moved between an operating position and a covering position. In the operating position of the cover, the camera provides images of an environmental region of the motor vehicle. In contrast, in the covering position of the cover, the camera (at least a lens of the camera) is covered by the cover against the environmental region. In addition, the invention relates to a camera as well as to a motor vehicle with a camera.

Cameras for motor vehicles are already prior art. It is known to attach a plurality of cameras to a motor vehicle. Then, the cameras can capture the entire environment around the motor vehicle. The cameras provide images each of an environmental region of the motor vehicle. Then, the images can be displayed on a display in the interior of the motor vehicle.

For example, a camera system can be employed, in which a front camera is disposed in the front region of the motor vehicle, a rear camera is disposed in the rear region of the motor vehicle as well as a lateral camera is respectively disposed in the respective exterior mirrors. In such a camera system, it is usual to display the current images of the rear camera on the display after engaging the reverse gear. Whereas in other situations, the images of the front camera can be displayed. In a still further mode of operation, a plan view representation can be generated from the images of all of the cameras, which shows the motor vehicle and its environment from a bird's eye view. This means that for example the current images of the rear camera are displayed on the display in some situations, while the same camera is not used in other situations.

For this reason, it is usual in the prior art to provide a cover for the rear camera and/or for the front camera. With such a cover, the camera can then be covered. This cover is usually movable between an operating position, in which the cover unblocks the view of the camera, and a covering position, in which the camera is covered by the cover and thus is disposed concealed behind the cover. Such a cover is employed by the vehicle manufacturers for two reasons: on the one hand, the cover is to serve for protecting the camera from exterior influences such as for example from a contamination, wind and the like. On the other hand, this cover also has a configurative function and contributes to the outward appearance of the motor vehicle. In this connection, the cover can for example be constituted by a logo of the vehicle manufacturer.

That the camera of a motor vehicle can be covered by a cover is for example known from the document U.S. Pat. No. 6,819,231 B2.

If the cover is brought into the covering position, thus, the following problems can arise: usually, the operating parameters of the camera such as for example the exposure time and/or the gain factor of the image sensor and/or the frame rate are adjusted depending on the brightness level of the imaged scene. With a darker scene, for example, a higher exposure time and/or a higher gain factor and/or a lower frame rate are adjusted. If the cover is now closed, such that the camera captures a dark scene, thus, the mentioned parameters are controlled such that they are adapted to the current brightness level of the scene (thus the dark scene). If the cover is again opened, if the images of the camera are to be displayed on the display, thus, the camera takes relatively much time in order to again provide useful images. Namely, it takes a certain period of time until the mentioned operating parameters are again adapted to the current brightness of the environment. For this reason, in the prior art, camera systems are already proposed, in which the camera is powered off with closed cover. However, this solution is also unsatisfactory because the reactivation of the camera also can take a relatively long time.

It is an object of the invention to demonstrate a solution how in a method of the initially mentioned kind the so-called "dead time" of the camera after opening the cover can be reduced compared to the prior art.

According to the invention, this object is solved by a method, by a camera as well as by a motor vehicle having the features according to the respective independent claims. Advantageous implementations of the invention are the subject matter of the dependent claims, of the description and of the figures.

A method according to the invention serves for operating a camera of a motor vehicle, wherein a cover is moved between an operating position, in which the camera provides images of an environmental region of the motor vehicle, and a covering position, in which the cover covers the camera against the environmental region. The current brightness level of a scene of the camera is acquired by the camera itself. In the operating position of the cover, at least one operating parameter of the camera is adjusted depending on the current brightness level of the scene. The camera acquires a movement operation of the cover from the operating position into the covering position. After acquiring the movement operation, the at least one operating parameter is adjusted to a value independent of the current brightness level of the scene, in particular whilst maintaining the activated operating state of the camera.

Accordingly, it is proposed, after acquiring the closure operation of the cover, to adjust the at least one operating parameter of the camera to a value independent of the current brightness level of the scene, which is acquired by the camera itself. In particular, the camera remains powered on even after closing the cover. These measures cause that after reopening the cover—if the cover is moved from the covering position into the operating position—the at least one operating parameter of the camera can particularly fast be controlled to the set value depending on the current brightness level of the scene. Thus, the camera provides useful images within a very short time, which can be presented on a display of the motor vehicle. Thus, the vehicle occupant does not perceive any delay, and the images can be immediately presented with a good brightness.

With the closed cover, the adjustment of the operating parameter can be realized independently of the current brightness level of the scene for example such that the operating parameter is adjusted independently of an adjusting algorithm of the camera, which is used for adjusting the operating parameter depending on the current brightness level with open cover.

With respect to the value, to which the operating parameter is adjusted independently of the current brightness level of the scene in the covering position of the cover, various embodiments can be provided:

In an embodiment, it is provided that after acquiring the movement operation, the operating parameter is adjusted to a value, which is received by the camera from a further, non-covered camera of the motor vehicle. For adjusting the operating parameter in the covering position of the cover, thus, a value can be used, which is determined by means of the further camera. This embodiment exploits the fact that cameras are also employed in today's motor vehicles, which are not covered in the operation. Such cameras are usually integrated in the respective exterior mirrors. These cameras then acquire the current brightness level of the environment of the motor vehicle and therefore can reliably determine the value for the adjustment of the operating parameter. In particular, the communication can be effected via a communication bus, for example the CAN bus.

Therein, it is preferably provided that the value of the operating parameter of the covered camera is matched to the current value of the same operating parameter of the further, non-covered camera. This matching can also be continuously performed such that the mutual values of the same operating parameter are always identical. This has the advantage that after reopening the cover, the operating parameter of the camera is already adjusted to the correct value and thus is adapted to the current brightness level of the environment. Immediately after opening the cover, the camera thus provides images with good quality.

If a movement operation of the cover from the covering position into the operating position is then acquired, thus, the operating parameter can be controlled by means of the camera itself starting from the value of the further camera again depending on the current brightness level of the scene. After opening the cover, the operating parameter is therefore adapted to the current brightness level of the scene of the camera.

In an alternative embodiment, it can be provided that after acquiring the movement operation of the cover from the operating position into the covering position, the operating parameter is adjusted to a rest value, which is constantly maintained for at least a preset time interval after acquiring the movement operation, in the covering position of the cover. This embodiment can be implemented without much effort. Because the at least one operating parameter only has to be adjusted to the rest value, and additional communication with another camera is preferably not required.

For example, this can be configured such that after acquiring the movement operation, the operating parameter is adjusted to a value as the rest value, which corresponds to a value of the operating parameter lastly adjusted before acquiring the movement operation. This means that the last value of the operating parameter is "frozen" upon closing the cover. This embodiment in particular proves particularly advantageous if the cover is reopened within a shorter time. For example, this can be the case in parking if the driver changes several times between the forward gear and the reverse gear in order to park the motor vehicle into a parking space in several steps. In this case, the cover is alternately moved back and forth between the covering position and the operating position. It can be assumed that the brightness of the environment will not change during this relatively short time such that the freezing of the operating parameter upon closing the cover entails that the operating parameter is furthermore adjusted to the correct value after reopening the cover.

Thus, if the cover is moved from the covering position into the operating position within the preset time interval, thus, the operating parameter is controlled again depending on the current brightness level of the scene acquired by means of the camera itself starting from the rest value (in particular the "frozen" value).

After lapse of the preset time interval—if the cover is furthermore in the covering position—very different embodiments can be provided: on the one hand, after lapse of the time interval, the operating parameter can be adjusted from the rest value to a preset, stored default value, which is typical of a normal brightness level of the scene and thus would be adjusted on normal lighting conditions during daytime. Namely, such a default value too has the advantage that the adaptation of the operating parameter to the current brightness level can be particularly fast effected after opening the cover. However, alternatively, it can be provided that after lapse of the preset time interval, the operating parameter is adjusted from the rest value to the mentioned value, which is received by the camera from the further, non-covered camera of the motor vehicle. After lapse of the time interval, the operating parameter can in particular be continuously matched to the same parameter of the further, non-covered camera.

Both alternatives ensure that the adaptation of the operating parameter to the current brightness level is particularly fast effected after opening the cover.

If the cover is reopened after lapse of the preset time interval, thus, the operating parameter is controlled starting from the preset default value or the value of the further camera depending on the current brightness level of the scene, which is acquired by means of the camera itself.

In particular, a frame rate and/or an exposure time of the image sensor and/or a gain factor of the image sensor can be adjusted as the operating parameter. Especially these parameters are usually adjusted depending on the current brightness level of the scene such that the method proves particularly advantageous with these parameters.

The acquisition of the movement operation of the cover can in particular be configured such that data communication between the camera and a controller of the cover is performed via a communication bus of the motor vehicle. The acquisition of the movement operation by the camera then includes that the camera receives information about the movement operation from the controller via the communication bus. The camera can be connected e.g. to the CAN bus and pick up information whether the cover is opened or closed on this CAN bus. This type of acquisition can be implemented without much effort because the cameras anyway are already connected to the CAN bus and pick up for example information about the current velocity of the motor vehicle via this communication bus in today's motor vehicles.

In addition, the invention relates to a camera for a motor vehicle, which is able to acquire a movement operation of a cover between the operating position and the covering position and is adapted to acquire a current brightness level of a scene of the camera, to adjust at least one operating parameter depending on the current brightness level in the operating position of the cover and to adjust the operating parameter to a value independent of the currently acquired brightness level of the scene after acquiring the movement operation of the cover from the operating position into the covering position.

A motor vehicle according to the invention includes a camera according to the invention. The motor vehicle is for example a passenger car.

The preferred embodiments presented with respect to the method according to the invention and the advantages thereof correspondingly apply to the camera according to the invention as well as to the motor vehicle according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Now, the invention is explained in more detail based on individual preferred embodiments as well as with reference to the attached drawings.

Figure 2:
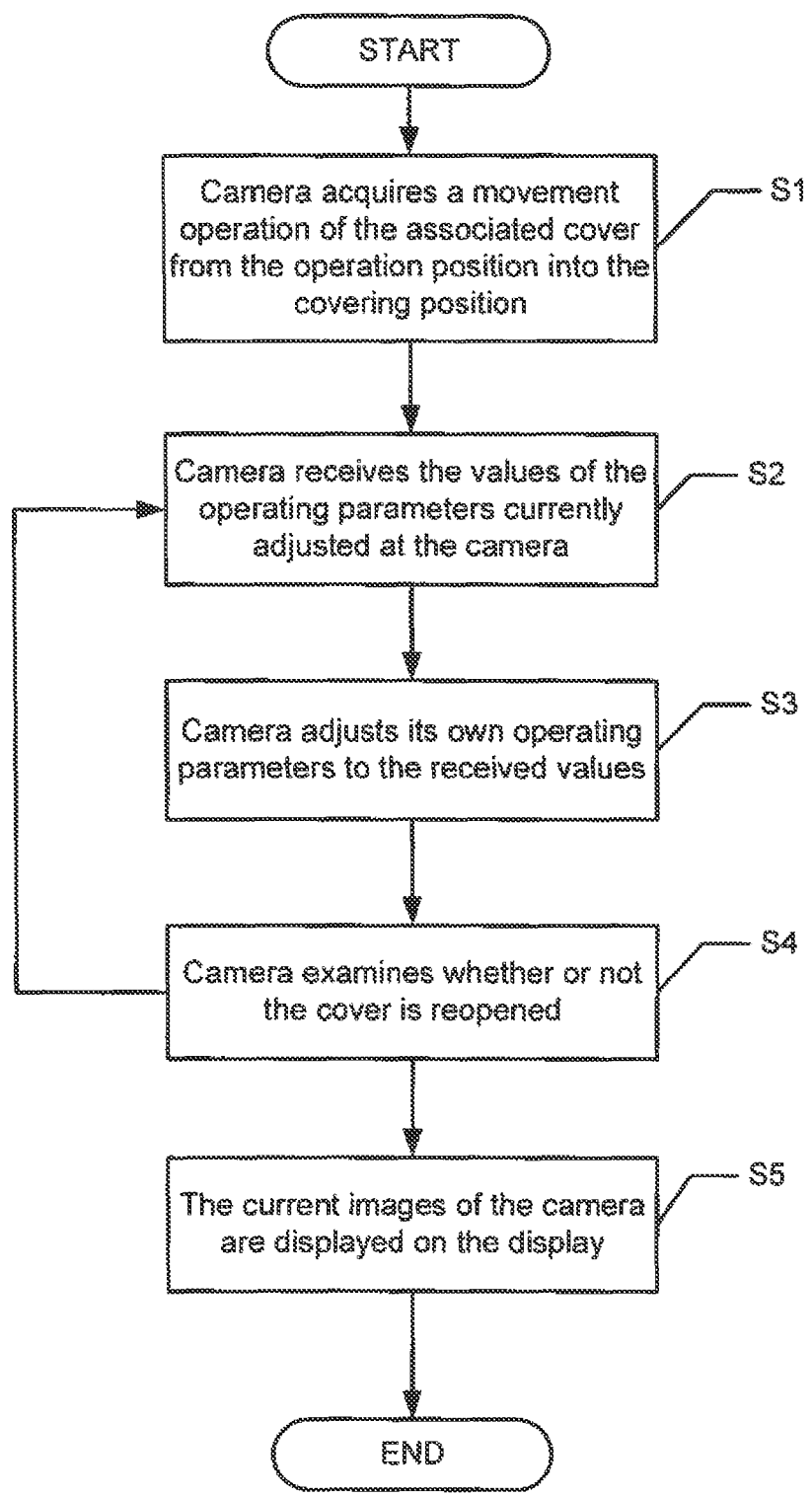
Figure 3:
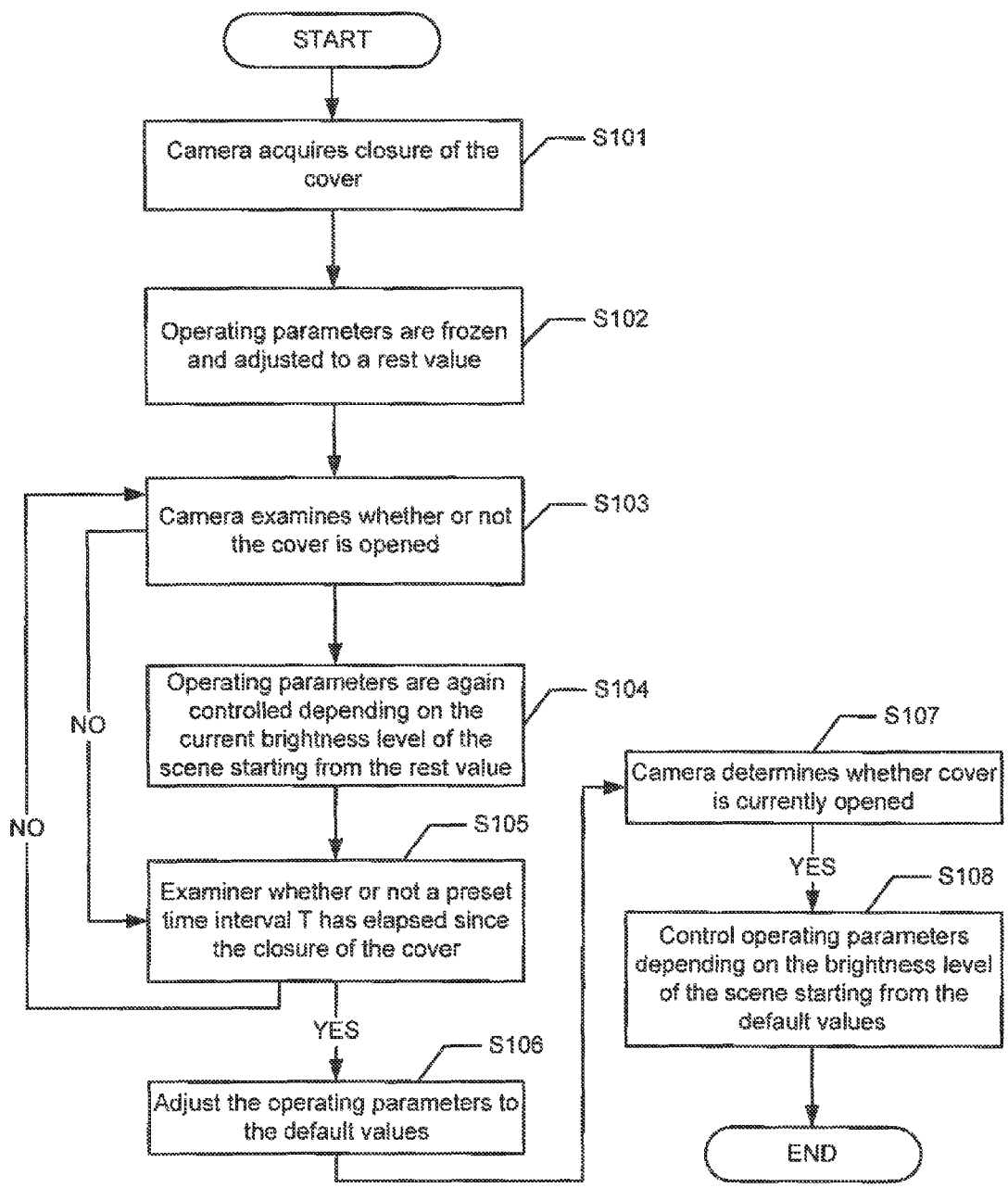

There show:

FIG. 1 in schematic illustration a motor vehicle according to an embodiment of the invention;

FIG. 2 a flow diagram of a method according to a first embodiment of the invention; and FIG. 3 a flow diagram of a method according to a second embodiment of the invention.

A motor vehicle 1 illustrated in FIG. 1 is for example a passenger car. The motor vehicle 1 includes a camera system 2 having at least one camera with an associated cover and optionally at least one camera without cover. In the embodiment, the camera system 2 includes a front camera 3 disposed in a front region of the motor vehicle 1, for example on a front bumper. The camera system 2 can also include a rear camera 4 disposed in the rear region, for example on a rear bumper or on a tailgate. In the embodiment, the camera system 2 additionally also has two cameras 5, 6 integrated in respective exterior mirrors 7, 8 of the motor vehicle 1.

For example, the cameras 3, 4, 5, 6 can be video cameras, which are each able to capture a sequence of images per second. The cameras 3, 4, 5, 6 can e.g. be CCD cameras or CMOS cameras. They are coupled to a display 9, on which the images of the cameras 3, 4, 5, 6 can be displayed. The display 9 is disposed in the interior of the motor vehicle 1, for example on a center console or a dashboard.

The camera system 2 can be switched between different modes. For example, if the reverse gear is engaged, thus, the images of the rear camera 4 can be displayed on the display 9. In another mode, the images of the front camera 3 can be displayed on the display 9. In still a further mode, an overall representation can be displayed on the display 9, which is calculated from the images of all of the cameras 3, 4, 5, 6. Such an overall representation can e.g. be a plan view representation, which shows the motor vehicle 1 as well as its environment from a bird's eye view.

A cover 10, 11 is associated with the front camera 3 and/or the rear camera 4, which can be moved between two positions. The cover 10, 11 can be moved back and forth between an operating position and a covering position. In the operating position, the cover 10, 11 is opened such that the associated camera 3, 4 can capture an environmental region 12, 13 of the motor vehicle 1. In the covering position of the cover 10, 11, the associated camera 3, 4 is covered against the respective environmental region 12, 13 such that images of the environmental region 12, 13 cannot be provided and the camera 3, 4 only sees a dark scene. In the covering position, the respective camera 3, 4 therefore sees exclusively the associated cover 10, 11, which is formed of an opaque material.

However, the lateral cameras 5, 6 are formed without cover such that the cameras 5, 6 always have a clear view. These cameras 5, 6 are not covered.

A controller 14 takes over the control of the movement of the cover 10, 11, which additionally is connected to a communication bus 15 of the motor vehicle 1, namely for example to the CAN bus. The cameras 3, 4, 5, 6 too can be connected to the communication bus 15.

The usual operation of the cameras 3, 4, 5, 6 is configured as follows: each camera 3, 4, 5, 6 itself usually captures the current brightness level of the respective scene (of the respective environmental region) 12, 13. Each camera 3, 4, 5, 6 then adjusts very different operating parameters of the respective image sensor depending on the brightness level. In particular, the exposure time of the image sensor, the gain factor of the image sensor as well as the frame rate belong to this. The frame rate is controlled such that a first frame rate of e.g. 30 images per second is adjusted with a lower gain factor (a brighter environment). If the gain factor exceeds a preset limit value (the environment becomes darker), thus, the frame rate is reduced to another value, for example to 15 images per second. Therein, the gain factor depends on the brightness level, wherein the brighter the imaged scene, the lower the gain factor. The same relation also applies to the exposure time of the image sensor.

The cover 10, 11 is only moved into the operating position and thus opened if the images of the respective camera 3, 4 are to be displayed on the display 9 at the current time. If the images of the camera 3, 4 are not displayed, the cover 10, 11 is closed. For example, the images of the rear camera 4 are displayed if the reverse gear is engaged. Upon engaging the reverse gear, thus, the cover 11 can also be moved into the operating position and thus be opened.

Such a control of the cover 10, 11 results in problems with respect to the above mentioned operating parameters of the camera 3, 4 in the prior art. If the cover 10, 11 is closed, thus, the camera 3, 4 only sees a very dark scene and thus increases the exposure time and the gain factor, while the frame rate is reduced. If the cover 10, 11 is then reopened if the images are to be displayed on the display 9, thus, the camera 3, 4 takes a certain dead time until the mentioned parameters are again adapted to the current brightness level of the scene. In order to avoid this dead time, below, two solutions are described:

According to the first solution, the camera 3, 4 communicates with at least one of the cameras 5, 6, which is not covered. If the cover 10 is moved into the covering position and therefore closed, thus, the values of the operating parameters gain factor and/or exposure time and/or frame rate of the camera 3, 4 are matched to the current values of the same operating parameters of the camera 5, 6. This matching is preferably continuously effected such that the parameters of the camera 3, 4 are equal to the parameters of the camera 5, 6 with closed cover 10, 11. The currently adjusted parameter values can be transferred from the camera 5, 6 via the communication bus 15 to the camera 3, 4. If the cover 10, 11 is then reopened, thus, the camera 3, 4 again controls its operating parameters itself, namely depending on the acquired brightness level of the own scene.

This first solution can also be exemplified based on a flow diagram as it is represented in FIG. 2. The method begins in a step S1, in which the camera 3, 4 acquires a movement operation of the associated cover 10, 11 from the operating position into the covering position. The acquisition of the closure operation is effected via the communication bus 15. In a second step S2, the camera 3, 4 receives the values of the mentioned operating parameters currently adjusted at the camera 5 6: the gain factor, the exposure time and the frame rate. In a further step S3, the camera 3, 4 adjusts its own operating parameters to the received values—matching to the parameter values of the camera 5, 6 is effected. In a further step S4, the camera 3, 4 examines whether or not the cover 10, 11 is reopened. If the cover 10, 11 is further closed, thus, the method returns to step S2, in which the camera 3, 4 receives new, current parameter values from the camera 5, 6. If it is determined in step S4 that the cover 10, 11 is reopened, thus, in a final step S5, control of the mentioned operating parameters is initialized depending on the brightness level of the own scene, wherein this brightness level is acquired by the camera 3, 4 itself. In step S5, the current images of the camera 3, 4 are also displayed on the display 9.

According to the second solution, "freezing" of the operating parameters occurs after closing the cover 10, 11. This means that after acquiring the closure operation of the cover 10, 11 by the camera 3, 4, the mentioned operating parameters are adjusted to the last value, which was adjusted as the last before closing the cover 10 11. This freezing of the operating parameters to the rest value is effected for a preset time interval, which can be in a range of values from 2 minutes to 5 minutes after closing the cover 10, 11. If the cover 10, 11 is further closed after lapse of this time interval, thus, the operating parameters are respectively adjusted to a preset, stored and constant default value, which is typical of a bright scene during daytimes. If the cover 10, 11 is reopened, thus, the operating parameters are again controlled depending on the current brightness level of the scene, namely starting from the rest value or the default value according to whether or not the preset time interval has elapsed.

Now, the second solution is described in more detail based on a flow diagram with reference to FIG. 3: the method begins in a step S101, in which the camera 3, 4 acquires the closure of the cover 10, 11. In a further step S102, then, the operating parameters gain factor, exposure time and frame rate are "frozen" and thus adjusted to a rest value. This rest value corresponds to that value, which was adjusted as the last before closing the cover 10, 11. In a further step S103, the camera 3, 4 examines whether or not the cover 10, 11 is opened. If the cover 10, 11 is opened, thus, the method ends in a step S104, in which the mentioned operating parameters are again controlled depending on the current brightness level of the scene starting from the rest value.

If it is determined in step S103, that the cover 10, 11 is further closed, thus, in a further step S105 it is examined whether or not a preset time interval T has elapsed since the closure of the cover 10, 11. The time interval T can e.g. be 3 minutes or 4 minutes or 5 minutes. If the time interval T has not yet elapsed, thus, the method returns again to step S103. If the time interval T has elapsed, thus, the method moves to another step S106, in which the mentioned operating parameters are adjusted to the default values. In a still further step S107, the camera 3, 4 once again examines whether or not the cover 10, 11 is currently opened. Only if the cover 10, 11 is opened, the method proceeds to a last step S108, in which the operating parameters are controlled depending on the current brightness level of the own scene starting from the default values.

The invention claimed is:

1. A method for operating a camera of a motor vehicle, wherein a cover is moved between an operating position, in which the camera provides images of an environmental region of the motor vehicle, and a covering position, in which the cover covers the camera against the environmental region, the method comprising:
acquiring a current brightness level of a scene of the camera by means of the camera;
in the operating position of the cover:
adjusting at least one operating parameter of the camera depending on the current brightness level of the scene;
acquiring a movement operation of the cover from the operating position into the covering position by the camera; and
after acquiring the movement operation:
adjusting the at least one operating parameter to a value independent of the current brightness level of the scene acquired by the camera whilst maintaining an activated operating state of the camera.

2. The method according to claim 1, wherein after acquiring the movement operation, the operating parameter is adjusted to a value, which is received by the camera from a further, non-covered camera of the motor vehicle.

3. The method according to claim 2, wherein after acquiring the movement operation, the value of the operating parameter is continuously matched, to the current value of the same operating parameter of the further camera.

4. The method according to claim 2, wherein a movement operation of the cover from the covering position into the operating position is additionally acquired by the camera, and after acquiring this movement operation, the operating parameter is controlled by means of the camera starting from the value of the further camera depending on the current brightness level of the scene.

5. The method according to claim 1, wherein after acquiring the movement operation, the operating parameter is adjusted to a rest value, which in the covering position of the cover is constantly maintained for at least a preset time interval after acquiring the movement operation.

6. The method according to claim 5, wherein after acquiring the movement operation, the operating parameter is adjusted to a value as a rest value, which corresponds to a value of the operating parameter lastly adjusted before acquiring the movement operation.

7. The method according to claim 5, wherein if a movement operation of the cover from the covering position into the operating position is acquired by the camera within the preset time interval, the operating parameter is controlled depending on the current brightness level of the scene starting from the rest value.

8. The method according to claim 5, wherein after lapse of the preset time interval, in the covering position of the cover, the operating parameter is adjusted from the rest value to:
a preset, stored default value, or a value received by the camera from a further, non-covered camera of the motor vehicle.

9. The method according to claim 5,
wherein if a movement operation of the cover from the covering position into the operating position is acquired by the camera after lapse of the preset time interval, the operating parameter is controlled depending on the current brightness level of the scene starting from the preset default value or the value of the further camera.

10. The method according to claim 1, wherein a frame rate and/or an exposure time and/or a gain factor are adjusted as operating parameter.

11. The method according to claim 1, wherein data communication between the camera and a controller of the cover is performed via a communication bus of the motor vehicle and the acquisition of the movement operation by the camera includes that the camera receives information about the movement operation from the controller via the communication bus.

12. A camera for a motor vehicle, which is adapted to acquire a movement operation of a cover between an operating position, in which the camera provides images, and a covering position, in which the camera is covered by the cover,
wherein the camera is configured to:

acquire a current brightness level of a scene of the camera, adjust at least one operating parameter of the camera depending on the current brightness level of the scene in the operating position of the cover, and adjust the at least one operating parameter to a value independent of the current brightness level of the scene, whilst maintaining an activated operating state of the camera, after acquiring the movement operation of the cover from the operating position into the covering position.

13. A motor vehicle with a camera according to claim 12.

\* \* \* \* \*